(12) United States Patent
Ahuja et al.

(10) Patent No.: US 7,609,640 B2
(45) Date of Patent: Oct. 27, 2009

(54) METHODS AND APPLICATIONS FOR AVOIDING SLOW-START RESTART IN TRANSMISSION CONTROL PROTOCOL NETWORK COMMUNICATIONS

(75) Inventors: Sadhna Ahuja, Waltham, MA (US); Tao Wu, Woburn, MA (US); Sudhir Dixit, Weston, MA (US)

(73) Assignee: Nokia Corporation, Espoo (FI)

( * ) Notice: Subject to any disclaimer, the term of this patent is extended or adjusted under 35 U.S.C. 154(b) by 1109 days.

(21) Appl. No.: 10/741,965

(22) Filed: Dec. 19, 2003

(65) Prior Publication Data

US 2005/0135248 A1 Jun. 23, 2005

(51) Int. Cl.
*G01R 31/08* (2006.01)
(52) U.S. Cl. ...................................... 370/236
(58) Field of Classification Search ................. 370/229, 370/230, 231, 235, 236, 236.1, 236.2
See application file for complete search history.

(56) References Cited

U.S. PATENT DOCUMENTS

| 6,246,670 | B1 * | 6/2001 | Karlsson et al. ............. 370/244 |
|---|---|---|---|
| 2002/0106991 | A1 | 8/2002 | Foore et al. |
| 2002/0150048 | A1 * | 10/2002 | Ha et al. ..................... 370/231 |
| 2003/0212801 | A1 * | 11/2003 | Yang-Huffman ............ 709/228 |
| 2003/0235151 | A1 * | 12/2003 | McClellan .................. 370/216 |
| 2004/0062201 | A1 * | 4/2004 | Deshpande ................. 370/235 |
| 2004/0103314 | A1 * | 5/2004 | Liston ........................ 713/201 |
| 2004/0162992 | A1 * | 8/2004 | Sami et al. |
| 2004/0192312 | A1 * | 9/2004 | Li et al. ...................... 455/445 |

FOREIGN PATENT DOCUMENTS

EP 1 052 797 A3 11/2000
WO WO 03/046677 A3 6/2003

OTHER PUBLICATIONS

Lijun Chen; *The design and analysis of a simple congestion control algorithm*; Dec. 11, 2003; 3 pages.
Kevin Brown, et al., *"M-TCP: TCP For Mobile Cellular Networks,"* Department of Computer Science, University of South Carolina, Columbia, SC, ACM SIGCOMM - Computer Communication Review, Jul. 29, 1977.

(Continued)

*Primary Examiner*—Seema S Rao
*Assistant Examiner*—Christine Duong
(74) *Attorney, Agent, or Firm*—Alston & Bird LLP

(57) ABSTRACT

A novel approach is provided for avoiding the "slow-start restart" in TCP communications when network conditions dictate such. The disclosed approach serves to overcome the latency related to the "slow-start restart" by assessing network conditions and avoiding the "slow-start restart" when network conditions justify the avoidance. The disclosed methods, applications and devices implement the periodic communication of a probe packet that is generated and transmitted from a TCP sender to a TCP receiver during the period that the TCP network connection remains idle. Receipt of the probe packet by the TCP receiver will trigger transmission of an acknowledgment message by the TCP receiver. Upon receipt of the acknowledgement message the TCP sender will restart measurement of the idleness period and, as such the "slow-start restart" is avoided.

15 Claims, 5 Drawing Sheets

OTHER PUBLICATIONS

Van Jacobson, et al., "*Congestion Avoidance and Control,*" Nov. 1988.

W.R. Stevens, "*TCP/IP Illustrated, vol. 1 - The Protocaols,*" Copyright date 1994, Addison Wesley Longman, Inc., pp. 275, 285-287, 310-316.

M. Allman, et al., "*Increasing TCP's Initial Window,*" NASA Lews/Sterling Software, http://tools.ietf.org/html/rfc2414, Sep. 1998.

Venkata Narayana Padmanabhan, "*Addressing the Challanges of Web Data Transport,*" University of California at Berkeley, Fall, 1998, pp. Cover, Abstract, 25-28, 141-151.

\* cited by examiner

METHODS AND APPLICATIONS FOR AVOIDING SLOW-START RESTART IN TRANSMISSION CONTROL PROTOCOL NETWORK COMMUNICATIONS

FIELD OF THE INVENTION

The present invention relates to network communication and, more specifically, to methods and applications for avoiding slow-start restart in Transmission Control Protocol (TCP) network communication.

BACKGROUND OF THE INVENTION

In mobile or wireless networks, especially those that implement interactive services, such as web services, web browsing and the like, it is important to maintain low user-perceived latency (i.e., delay). Latency in the mobile network environment will typically negatively impact application performance and overall user satisfaction.

The mobile network is more prone to latency problems than a standard wireline network because wireless networks rely on a radio link that is characterized by low radio bandwidth (e.g., around 30 Kilobits per second (Kbps) usable bandwidth in a General Packet Radio Service (GPRS) connection). In addition, a significant latency is also introduced by the radio link layer that combats high bit error rates. The algorithms and implementation of underlying transport protocols further intensify the latency problem in mobile networks.

FIG. 1 provides an illustration of a conventional mobile network, in which a network proxy is implemented to gain access to the Internet. In this network 100 architecture the mobile terminal 110 is in radio communication with a network antenna 120. The network antenna is in communication with a network proxy 130 via the access network 140. The network proxy 130 acts as an intermediary between the mobile terminal and the Internet 150 to ensure security, administrative control, and caching service. The origin server 160 provides access to the web service or web page that the mobile terminal desires. This architecture is common in current and future mobile networks, such as a Wireless Application Protocol (WAP) gateway network, in which the network proxy serves as the gateway and translates information into Wireless Markup Language (WML). In such an architecture, any request from the mobile terminal goes to the origin server through this network proxy. However, even in mobile networks that do not implement a network proxy the problems related to latency are still prevalent due to low radio bandwidth, use of the radio link layer and other network factors.

Mobile Web Services (MWS) use HTTP/TCP/IP (Hyper-Text Transfer Protocol/Transmission Control Protocol/Internet Protocol) for communication between the web service client and the service provider, which includes the radio link. In an attempt to control network congestion, TCP implements congestion avoidance and control algorithms. While these congestion avoidance algorithms are advantageous in the wireline communication network, studies have shown that these algorithms can be overly conservative, resulting in performance degradation and adding unwarranted latency into the data transmission process.

At the onset of communication between the network proxy and the client, TCP implements a congestion avoidance algorithm as a means of trying to eliminate or lessen congestion in the network. This algorithm is referred to as the "slow-start" algorithm and it attempts to efficiently allocate network resources by identifying underutilized network connections.

The "slow-start" algorithm functions in the following manner. Upon receipt of the first communication from a terminal, the network proxy sets a congestion window. The congestion window indicates the maximum amount of data (i.e., the number of bytes) that can be sent out on a connection without being acknowledged (i.e, without an acknowledgement message being sent from the client). TCP detects congestion when it fails to receive an acknowledgement for a packet within the estimated retransmit timeout (RTO) period. Thus, when the network proxy fails to receive an acknowledgement from the client within the estimated timeout, the network proxy assumes that the data packet that it sent out was lost (i.e., dropped) and that the network is, therefore, congested. In this instance, the network proxy decreases the congestion window to one maximum segment size (MSS) and retransmits the data packet. Under other conditions, in which the network proxy receives an acknowledgement, it increases the congestion window by one MSS.

FIG. 2 illustrates the TCP message sequence between the client terminal and the network proxy and the implementation of the "slow-start restart", in accordance with the prior art. For the sake of clarity, the TCP message sequence between the network proxy and the origin server is not addressed in FIG. 2. The communication between client and the network proxy server ensues at stage 200, when the client sends the network proxy a SYN request for establishing a connection. Upon receipt of this initial communication the network proxy server establishes an initial congestion window for the connection. In this example the congestion window is set to 956 bytes, which equates to one MSS. This means that, absent receipt of an acknowledgement from the client, the network proxy is allowed to send the client the minimum of the client's advertised window and its own congestion window.

At stage 210, the network proxy responds to the SYN request and, at stage 220, the client sends an acknowledgement to the network proxy. Since the network proxy received the acknowledgement within the estimated timeout period (referred to as the retransmit timeout period), the network proxy increases the congestion window by one MSS. In this example, the congestion window expands to two segments or 1912 bytes. Once the congestion window is expanded, absent receipt of an acknowledgement from the client, the network proxy is now allowed to send the client up to 1912 bytes (i.e., two segments).

At stage 230, the client sends the network proxy an HTTP request, which requests access to a specified web page and, at stage 240, the network proxy sends an acknowledgment to the client that the request has been received. In turn the network proxy, contacts the origin server to retrieve the web page for the client.

Once the network proxy server communicates with the origin server, at stage 250, the network proxy responds to the client with the requested web page or some other response from the origin server. It is noted that at stage 250, what is referred to in the art as the "slow-start restart" has occurred. The "slow-start restart" entails contraction of the congestion window if the TCP connection between the client and the network proxy remains idle for a period of time in excess of a timeout period (referred to herein as the second timeout period). In the example of FIG. 2, the congestion window has been contracted to one MSS, i.e., 956 bytes. The second timeout period will be implementation specific, and may be the round-trip time (RTT) or the retransmit timeout (RTO). TCP shrinks down the congestion window to one segment in fear of overwhelming the network in the absence of any knowledge of the current network conditions.

The "slow-start restart" concept was introduced in TCP communication to avoid sudden bursts of data into a network whose conditions are unknown because the connection has been idle for 'too long'. However, the "slow-start restart" can unnecessarily throttle the performance of an already slow OTA (over-the-air) connection, even when there is no congestion on the network. Additionally, it is noted that in typical Mobile Web Services (MWS) communication the transmissions are typically short (only a few packets) and, as such, the TCP "slow-start restart" can severely limit the MWS performance.

There are numerous factors that can cause the TCP connection to remain idle for a long time. In one example, it may take the server a long time to reply to the client's request due to various reasons. One reason could be that the task the server needs to perform takes a lot of time (for example, it may need to request information from other servers and assemble the information to form the requisite reply). In another example, typically a network proxy first performs a Domain Name Server (DNS) query to map the domain name to servers on the Internet before contacting the origin server. Once the DNS query has been performed, the network proxy establishes a new TCP connection with the origin server, forwards the client's HTTP request and waits for the response before it can start sending any data to the client.

FIG. 3 illustrates the TCP message sequence between the client terminal and the network proxy in an instance in which the "slow-start restart" is not required because the idle period does not exceed the second timeout period. The FIG. 3 example illustrates that in instances in which the "slow-start restart" is averted; the overall delivery of data between the network proxy and the client occurs in less time, i.e., delays or latency in data delivery are prevented. In the FIG. 3 example the idle time (the time between the end of stage 230 and the beginning of stage 250) is less than the second timeout period and, therefore, the "slow-start restart" does not occur and the congestion window remains at its previous value, two segment lengths or 1912 bytes. Because the congestion window is not contracted, the subsequent transmission of data between the network proxy and client occurs with less round-trips than would be required if the window had been contracted. This is evident in the comparison of the FIG. 2 and FIG. 3 examples. The FIG. 2 example requires three round-trip transmissions, while the FIG. 3 example transmits the same amount of data in two round-trips. The effect on delivery time will be even more significant if the HTTP response (stage 250) is larger in byte size because the congestion window growth is faster in FIG. 3 than in FIG. 2. Thus, the FIG. 2 example, in which the "slow-start restart" is implemented, provides for greater delay or latency in the overall process of delivering data to the client.

Various different solutions have been proposed to overcome the latency problems related to the "slow-start restart" prevalent in TCP communications. While some of these solutions have been successful in addressing a portion of the latency problems attributable to "slow-start restart", none of the known solutions address the problem related to idle time at the TCP sender. The following provides examples of some of the known solutions for overcoming latency problems related to "slow-start restart".

Recently, it is becoming more common to implement a Performance Enhancing Proxy (PEP) within the network architecture to improve the performance of Internet protocols on networks where native performance is poor due to link characteristics. These PEPs can provide performance enhancements at various protocol layers. A transport-layer PEP has been suggested for mobile networks, which addresses the "slow-start restart" problem in situations where the mobile terminal experiences temporary disconnections (such as during handoffs). Such a transport-layer PEP is proposed in the article entitled "M-TCP: TCP for Mobile Cellular Networks", K. Brown et al., ACM Computer Communications Review, Volume 27(5), October 1997. Although, the transport-layer PEP described in the article focuses on avoiding the "slow-start restart", it does so in the context of data being available for delivery while the receiving device is not ready to receive it. As such, the transport-layer PEP does not address the problem of avoiding the "slow-start restart" when the receiving device is awaiting delivery of information but no data is available for transmission causing the idle time to exceed the timeout period.

Additionally, various methods have been implemented to that use probes to detect whether a connection is alive. For example, the TCP Keepalive option provides for probes to be sent to a client if the connection has been idle for a sustained period of two hours (this interval value is system-wide and any changes to this interval will affect all applications using TCP). The probe is usually an empty data packet (or a 1-byte packet) with a sequence number that is smaller than the receiver's expected sequence number. This forces the client to respond with an ACK, thus indicating that the connection is still alive. However, the TCP Keepalive option is used only to detect whether the other endpoint is still active and it performs such at a prolonged interval of two hours. In addition, the TCP Keepalive option does not detect network conditions or otherwise improve TCP performance.

A TCP Fast Start algorithm has been suggested, which provides a method for resuming data communication after long periods of idleness in the TCP connection. See "Addressing the Challenges of Web Data Transport", V. N. Padmanabhan, PhD Thesis, University of California at Berkeley, September 1988. The proposed algorithm works in the following manner. After a long idle period, instead of performing 'slow-start restart', the sender uses the same value of congestion window as before the idle period and initiates the 'fast start' phase by sending out a burst of packets. Packets sent during the fast start phase are marked with a low priority so that if the network had become congested while the connection remained idle, the intermediate routers can simply drop the fast start packets. When a congested condition is detected, the algorithm falls back to the standard slow-start. Although this algorithm is capable of avoiding unnecessary "slow-start restarts", it violates the congestion avoidance principles of TCP by sending a burst of packets into a network whose conditions are unknown.

Additionally, several solutions have focused on a proposal to have a 'faster' slow-start. An example is increasing the initial congestion window to two or four times the MSS. However, as it should be evident, these solutions are mere stop gate solutions, in that, the "slow-start restart" is still implemented in case the connection idle time exceeds the second timeout period.

The need exists to develop a method and application for avoiding the "slow-start restart" in TCP communications when network conditions dictate such. The methods and applications will characteristically eliminate latency in the network and, especially in a mobile or wireless network, improve web services performance. The desired solution shall address the problem of avoiding the "slow-start restart" when the receiving device is awaiting delivery of information but no data is available for transmission, resulting in the connection remaining idle for a period longer than the timeout. In addition, the desired solution shall be implemented while cognizant of current network capacity conditions. In this regard, the desired solution shall avoid the "slow-start restart" only if there is no current congestion within the network.

BRIEF SUMMARY OF THE INVENTION

The present invention provides for methods, applications and devices for avoiding the "slow-start restart" in TCP communications. As previously discussed, the TCP "slow-start restart", which was employed to combat network congestion, has a general tendency to add latency to communications in a mobile or wireless network environment. This invention serves to overcome the latency related to the "slow-start restart" by assessing network conditions and avoiding the "slow-start restart" when network conditions justify the avoidance.

The methods, applications and devices of the present invention implement communication of a probe packet that is generated and transmitted from a TCP sender to a TCP receiver during a TCP network connection. Receipt of the probe packet by the TCP receiver will trigger the transmission of an acknowledgment message by the TCP receiver. Upon receipt of the acknowledgement message the TCP sender will restart measurement of the idleness period and, as such, the "slow-start restart" is avoided. The communication of the probe packets, referred to as a probing process, and the receipt of the probe packet acknowledgement allows for the TCP sender to be aware of current network congestion conditions so that the TCP sender can avoid the "slow-start restart" when network conditions dictate such. Therefore, the present invention reduces the total data transfer time over an air interface by avoiding unnecessary "slow-start restarts" under non-congested network condition.

One embodiment of the invention is defined by a method for avoiding "slow-start restart" in Transmission Control Protocol (TCP) network communications. The method includes the step of establishing a TCP connection between a TCP sender and a TCP receiver and setting an idle counter at the TCP sender that measures the time interval between the current time and the last communication with the client, which could be the receipt of an acknowledgement from the client or the transmission of a packet to the client. The TCP "slow-start restart" is triggered when the TCP sender resumes sending data to the receiver after the connection has remained idle for longer than the maximum allowed period of idleness. The method further includes the steps of transmitting, from the TCP sender to the TCP receiver, a probe packet and the corresponding transmission of an acknowledgement by the TCP receiver, upon receipt of the probe packet. The probe packet will typically be a data packet having an empty payload and indicating a sequence number that is one less than the sequence number anticipated by the TCP receiver. The method concludes by resetting the idle counter upon receipt of the probe packet's acknowledgement to avoid occurrence of the slow-start restart in the TCP connection.

The period for transmission of the probe packets may be the median value of the round-trip time (RTT) and the transmit timeout (RTO); one-half the retransmit timeout (RTO) or any other designated period may be defined.

The probe packet will typically be transmitted from the TCP sender periodically to estimate the congestion of the network and insure that the idleness time does not exceed the allowable limit for triggering the "slow-start restart" process. The period for transmission of the probe packets may be derived from the values of the round-trip time (RTT) or the retransmit timeout (RTO). For example, it may be the median value of the round-trip time (RTT) and the retransmit timeout (RTO); one-half the retransmit timeout (RTO/2) or any other designated period may be defined.

The method may further include the step of expanding the congestion window upon receipt of the acknowledgement for the probe packet in order to allow for a greater volume of data to be transmitted when the TCP sender becomes ready to send data to the TCP receiver. This provides additional performance enhancement by not only avoiding "slow-start restart", but also resuming communication at a higher flow rate.

The invention is further embodied in an application for avoiding Transmission Control Protocol (TCP) "slow-start restart" at a TCP sender. The application includes a computer readable storage medium having computer-readable program instructions embodied in the medium. The computer-readable program instructions including first instructions for establishing a TCP connection between the TCP sender and a networked TCP receiver and second instructions for generating a probe packet at a TCP sender that is repeatedly transmitted to a TCP receiver during the TCP connection to avoid occurrence of the "slow-start restart" in the TCP connection upon receipt, by the TCP sender, of a probe packet acknowledgement. The probe packet will typically include an empty payload and a sequence number that is one less than a TCP receiver anticipated sequence number. Receipt of the acknowledgement by the TCP sender will reset the idleness counter and avoid the occurrence of the "slow-start restart" occurring at the TCP sender.

Additionally, the invention is defined by a network node device that includes a controller that establishes a TCP connection with a client, generates a probe packet and transmits the probe packet. The network node also includes a counter that counts an idle time that corresponds to an interval between the current time and the last packet sent or received, which could be the receipt of an acknowledgement from the client or the transmission of a packet to the client. The controller resets the idle counter, upon receipt of a probe packet acknowledgement from the client, to avoid occurrence of the "slow-start restart" in the TCP connection. The controller of the network node additionally provides for establishing a congestion window at the node upon establishment of the connection. The congestion window defines the maximum amount of data that can be transmitted by the node. The controller may additionally provide for expanding the congestion window upon receipt of the probe packet acknowledgement. Expanding the congestion window provides for a greater amount of data to be transmitted from the node to the client.

Thus, the present invention serves to overcome the latency related to the "slow-start restart" by assessing network conditions and avoiding the "slow-start restart" when network conditions justify the avoidance. The implementation of the invention is especially relevant in wireless or mobile networks, in which latency adversely affects the performance of web services and diminishes user satisfaction.

BRIEF DESCRIPTION OF THE SEVERAL VIEWS OF THE DRAWINGS

Figure 1:
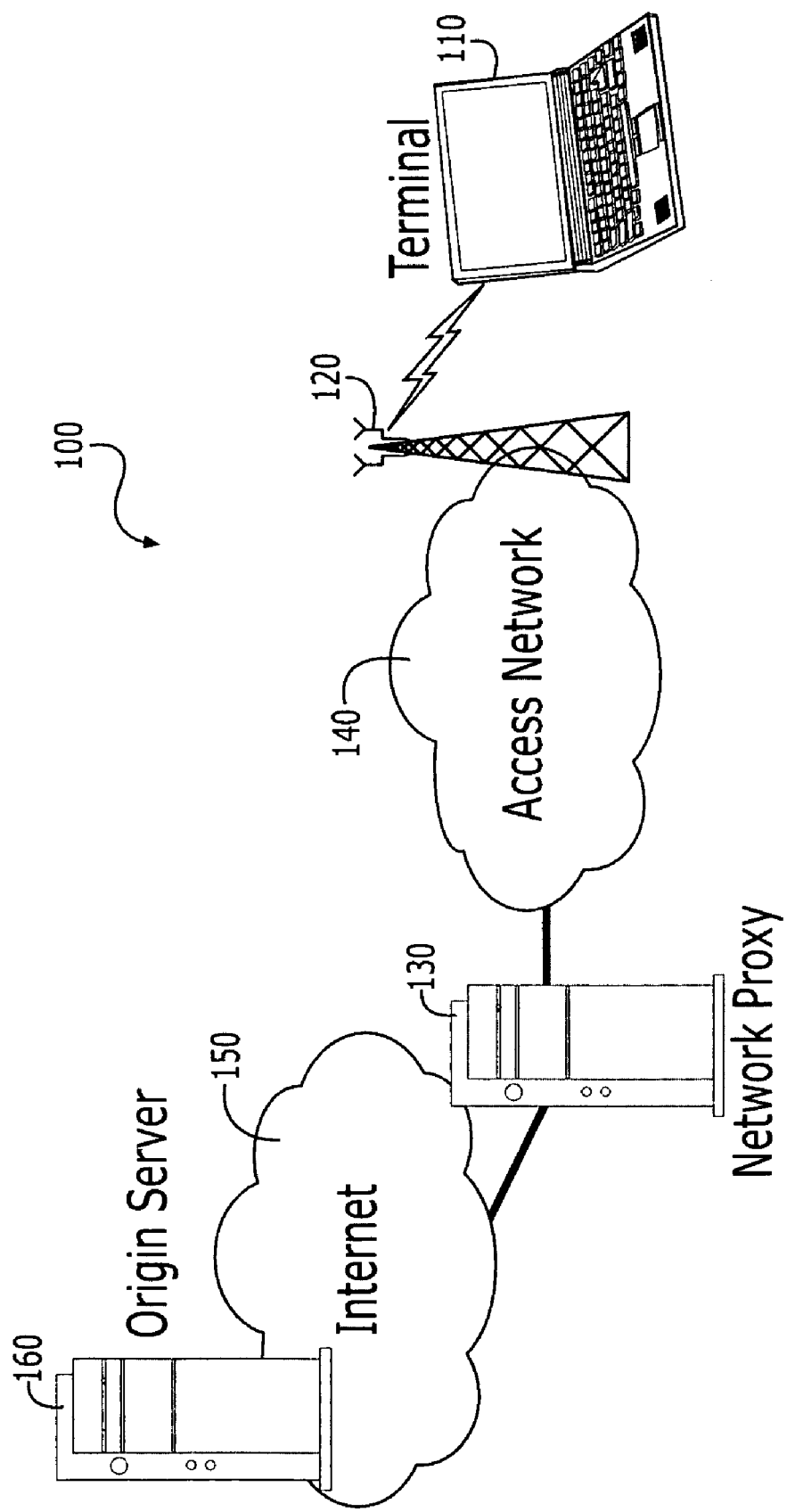

Having thus described the invention in general terms, reference will now be made to the accompanying drawings, which are not necessarily drawn to scale, and wherein:

FIG. 1 is a block diagram of a conventional wireless/mobile network that implements a network proxy, in accordance with the prior art.

Figure 2:
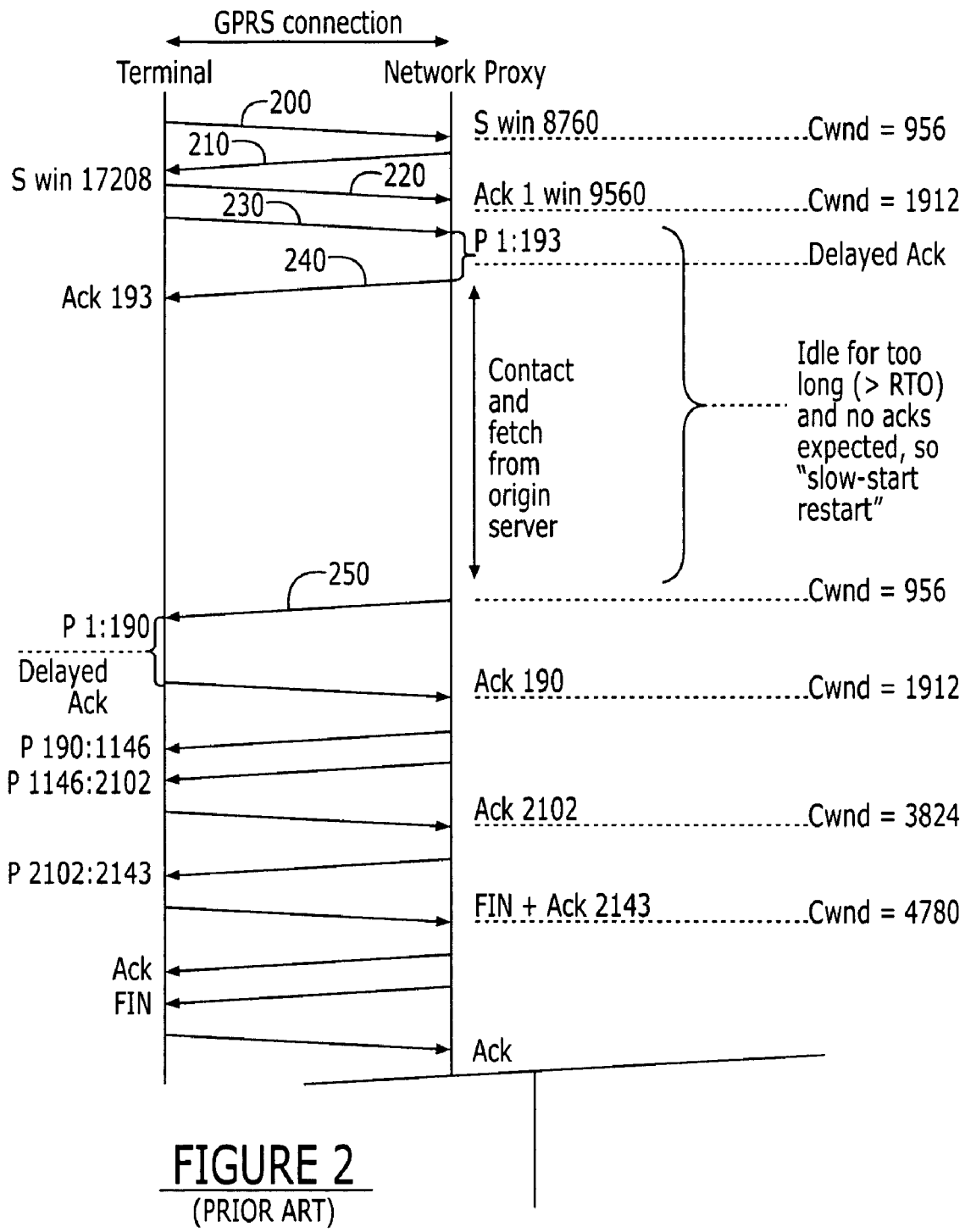

FIG. 2 is an illustration of Transmission Control Protocol (TCP) message sequence between a TCP sender and a TCP receiver terminal that triggers the "slow-start restart", in accordance with the prior art.

Figure 3:
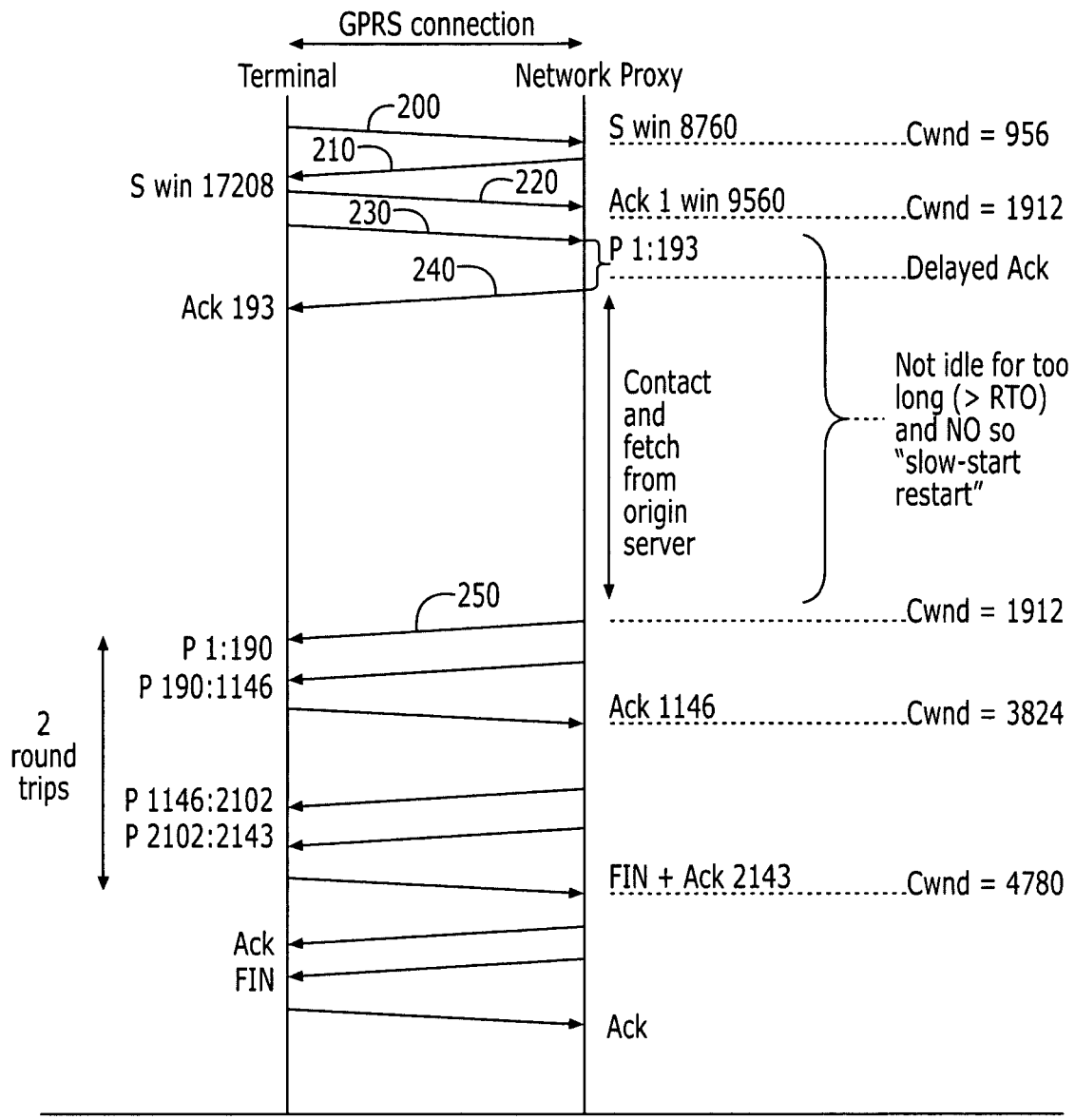

FIG. 3 is an illustration of TCP message sequence between a TCP sender and a TCP receiver terminal that fails to trigger the "slow-start restart", in accordance with the prior art.

Figure 4:
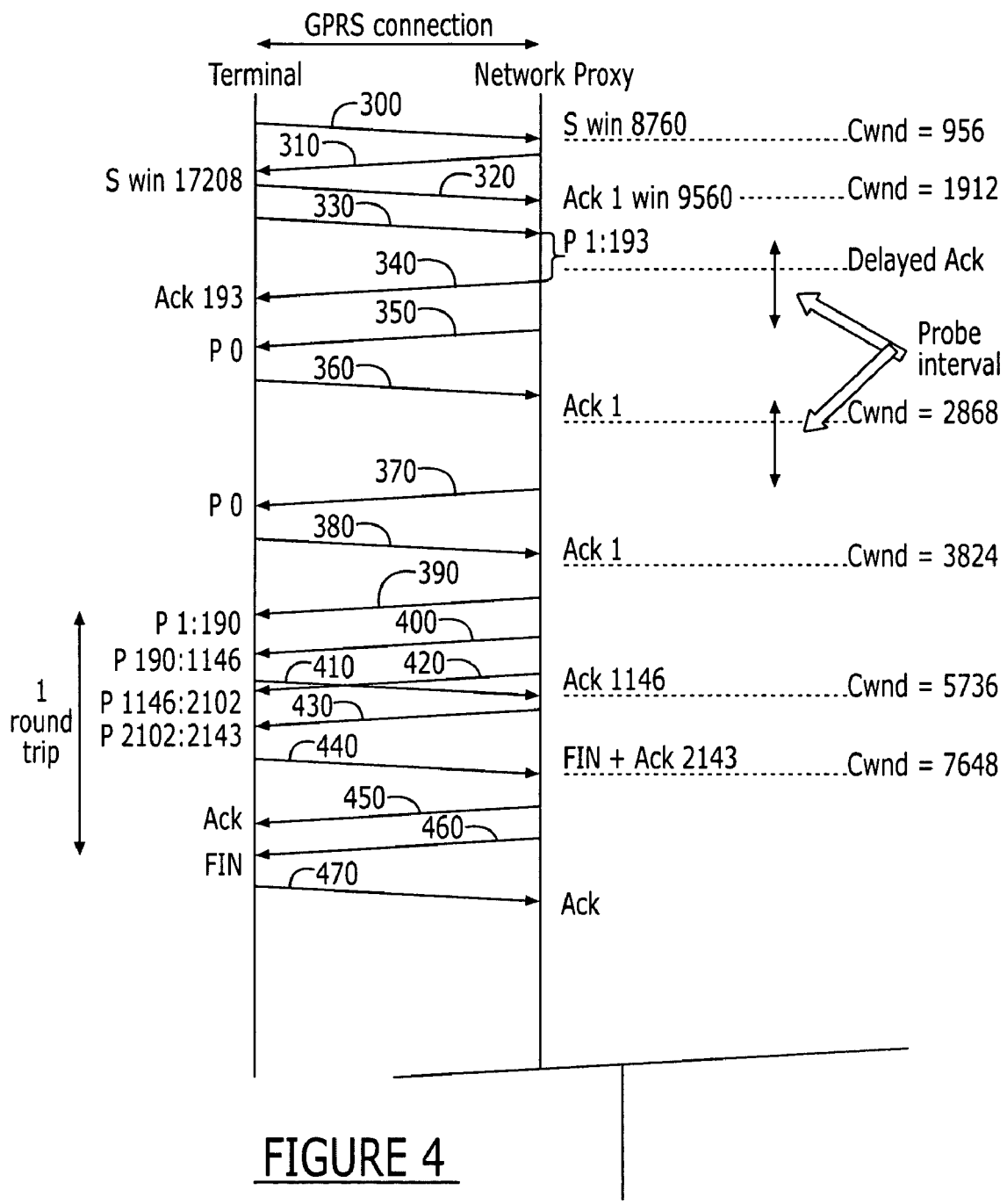

FIG. 4 is illustration of TCP message sequence between a TCP sender and a TCP receiver terminal implementing probe packet transmission to avoid the "slow-start restart", in accordance with an embodiment of the present invention.

Figure 5:
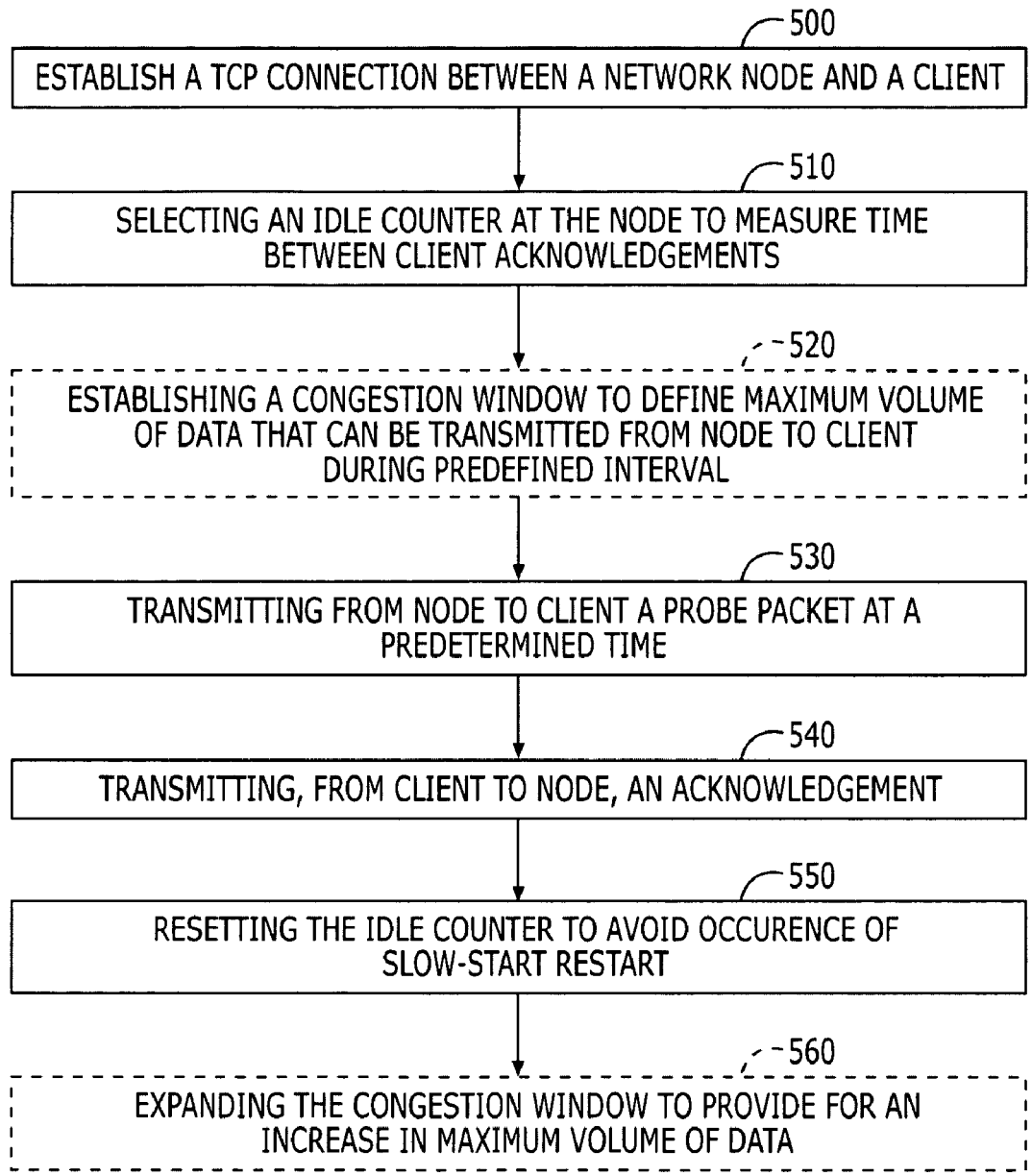

FIG. 5 is a flow diagram of a method for avoiding "slow-start restart" in TCP network communications, in accordance with an embodiment of the present invention.

DETAILED DESCRIPTION OF THE INVENTION

The present inventions now will be described more fully hereinafter with reference to the accompanying drawings, in which some, but not all embodiments of the invention are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

The present invention provides for methods and applications for avoiding the "slow-start restart" in TCP communications. The methods and applications implement the communication of a probe packet transmitted from a TCP sender, such as a network node, to a TCP receiver, such as a client, during a network connection. Receipt of the probe packet by the TCP receiver will trigger the transmission of an acknowledgment message by the TCP receiver. Upon receipt of the acknowledgement message the TCP sender will restart measurement of the idleness period and, as such the "slow-start restart" is avoided. The communication of the probe packets, referred to as a probing process, and the receipt of an acknowledgement by the TCP sender provides the TCP sender with awareness that current network conditions do not require the occurrence of the "slow-start restart". In other words, if the TCP sender sends the probe packet and does not receive an acknowledgement then the TCP sender assumes that the packet was lost or dropped due to network congestion, in which case, the "slow-start restart" will occur. As such, the present invention reduces the total data transfer time over an air interface by avoiding unnecessary "slow-start restarts" under non-congested network condition.

The provision that provides for probe packets to be communicated from a network TCP sender can be implemented at the Operating System (OS) kernel level. The exact implementation will vary depending on the type and function of the TCP sender that generates and communicates the probe packets.

Probe packets can be sent repeatedly in various fashions, but in one embodiment, probe packets are sent periodically. In this embodiment, the periodic time interval to trigger the sending of probe packets may be derived from the current values of RTT and RTO. In one embodiment of the invention the periodic time interval is defined as the median value of RTT and RTO. In an alternate embodiment the periodic time interval is defined as RTO/2. Other measures of the period may also be employed.

FIG. 4 illustrates a TCP message sequence between a TCP sender and a TCP receiver in conjunction with a method for avoiding TCP "slow-start restart", in accordance with an embodiment of the present invention. For the sake of clarity, the TCP message sequence between the TCP sender and the origin server is not addressed in FIG. 4. The communication between the TCP receiver and the TCP sender ensues at stage 300, when the TCP receiver sends the TCP sender a SYN request. Upon receipt of this initial communication the TCP sender server establishes an initial congestion window for the connection. In this example the congestion window is set to 956 bytes, which equates to one MSS (Maximum Segment Size). This means that the TCP sender is allowed to send the TCP receiver up to 956 bytes of data (i.e., one segment) prior to receiving an acknowledgement from the TCP receiver.

At stage 310, the TCP sender responds to the SYN request and, at stage 320, the TCP receiver sends an acknowledgement to the TCP sender. Upon receipt of the acknowledgement, the TCP sender increases the congestion window by one MSS (Maximum Segment Size). The congestion window is expanded because the TCP receiver has been responsive to the TCP sender's response (i.e., an acknowledgement has been sent), which indicates that the network is not currently experiencing congestion and, as such, the TCP sender can send more information. In this example, the congestion window expands to two segments or 1912 bytes. Once the congestion window is expanded, the TCP sender is now allowed to send the TCP receiver up to 1912 bytes (i.e., two segments) prior to receiving an acknowledgement from the TCP receiver.

At stage 330, the TCP receiver sends the TCP sender an HTTP request, which requests access to a specified web page and, at stage 340, the TCP sender sends an acknowledgment to the TCP receiver that the request has been received. In turn the TCP sender, contacts the origin server to retrieve the web page for the TCP receiver.

While the TCP sender is communicating with the origin server or conducting other related network communications, such as a DNS query or the like, idle time in the communication between the TCP sender and the TCP receiver ensues. In order for the idle time to not accrue to a level that would invoke the "slow-start restart", at stage 350, the TCP sender transmits a probe packet to the TCP receiver. The probe packet will be sent after a certain predefined period of idleness and if there is no other communication expected from the TCP receiver, e.g. the TCP sender has not sent the TCP receiver any recent communications for which the TCP receiver is expected to acknowledge. The probe packet will typically be an empty data packet with a sequence number that is one less than the TCP receiver's expected sequence number. At stage 360, the TCP receiver responds to the probe packet with an acknowledgement. Receipt of the acknowledgement by the TCP sender will trigger the restart of the idleness counter, i.e., the measurement of the period of time for which the connection has been idle. Additionally, upon receipt of the acknowledgement by the TCP sender, the congestion window may be expanded by the TCP sender. In this example, the congestion window is expanded to three segments or 2868 bytes. Once the congestion window is expanded the TCP sender is now allowed to send the TCP receiver up to 2868 bytes of data (i.e., three segments) prior to receiving an acknowledgement from the TCP receiver.

If at this stage, the TCP sender still does not have data available to be sent to the TCP receiver, then the additional communication idle time between the TCP sender and the TCP receiver prompts, at stage 370, the TCP sender to transmit an additional probe packet to the TCP receiver once the idleness counter maintained by the network server reaches the predefined period of idleness. This repeated probing of the TCP receiver provides the TCP sender awareness as to current network congestion conditions and obviates the need to perform a "slow-start restart". At stage 380, the TCP receiver responds to the probe packet with an acknowledgement. Receipt of the acknowledgement by the TCP sender will, once again, trigger the restart of the idleness counter. Upon receipt of the acknowledgement by the TCP sender, the congestion window may once again be expanded. In this example, the congestion window is expanded to four segments or 3824 bytes. Once the congestion window is expanded the TCP sender is now allowed to send the TCP receiver up to 3824 bytes of data (i.e., four segments) prior to receiving an acknowledgement from the TCP receiver.

Once the TCP sender communicates with the origin server, at stage 390, the TCP sender responds to the TCP receiver with the requested web page or some other response from the origin server. It is noted that a "slow-start restart" has not occurred (i.e., the congestion window has not been contracted) because the TCP sender has received acknowledgements from the TCP receiver while the TCP sender was communicating with the origin server. Additionally, the congestion window has opened such that TCP sender can communicate data to the TCP receiver in fewer round trips than would be required if the congestion window contracted or remained constant.

In the embodiment of FIG. 4, stages 390-440 represent data being communicated from the TCP sender to the TCP receiver in one round trip. In the FIG. 1 embodiment, in which the present invention is not implemented, three round trips are required to transmit the same volume of data. Thus, by avoiding the "slow-start restart" the TCP connection is able to transmit data more efficiently by avoiding unnecessary latency in the communication of data. Additionally, at stages 410 and 440 acknowledgements are communicated from the TCP receiver to the TCP sender, which further open up the congestion window. At stage 410, the congestion window is opened to six segments or 5736 bytes of data and at stage 440, the congestion window is opened to eight segments or 7648 bytes of data, merely demonstrating that the congestion window may be opened in larger increments if so desired.

FIG. 5 is a flow diagram of a method for avoiding "slow-start restart" in a TCP connection, in accordance with an embodiment of the present invention. At step 500, a TCP connection is establishing between a TCP sender, such as a network proxy and a TCP receiver, such as a client, and, at step 510 an idle counter is set, at the TCP sender, which measures the interval between the current time and the communication with the client, which could be the receipt of an acknowledgement from the client or the transmission of a packet to the client. Exceeding the maximum allowable idle time, referred to herein as a timeout, will trigger the occurrence of a "slow-start restart", thereby shrinking the congestion window, typically to one MSS.

At optional step 520, a congestion window is established at the onset of the establishment of the connection. The congestion window will define the maximum allowable volume of data that can be transmitted from the TCP sender to the TCP receiver at any time. In a typical "slow-start restart" decreasing the congestion window will aid in providing less congestion to the overall network environment.

At step 530, at a predetermined time, the TCP sender will transmit a probe packet to the TCP receiver. The probe packet will typically include an empty payload and a sequence number that is one less than the sequence number anticipated by the TCP sender. The predetermined time will be less than the maximum allowable idle time, typically the median of the RTT and RTO, one-half the RTO or any other suitable interval. In most embodiments, the TCP sender will transmit the probe packets at the predetermined time interval, if the connection is in an idle state. Periodic transmission of the probe packets allows for the TCP sender to assess current network congestion levels and to avoid a "slow-start restart" if network conditions dictate such. At step 540, the TCP receiver will respond to the receipt of the probe packet by transmitting, to the TCP sender, an acknowledgement.

Upon receipt by the TCP sender of the acknowledgement, at step 550, the TCP sender will reset the idle counter to avoid occurrence of the slow-start restart in the TCP connection upon receipt of the acknowledgement. Receipt of the acknowledgement by TCP sender results in the TCP sender assuming that the network is not congested because the probe packet reached its specified destination without being lost or dropped. In this instance, a "slow-start restart" can be avoided.

Additionally, at optional step 560, upon receipt of the acknowledgement by the TCP sender, the congestion window may be expanded to allow for a greater volume of data to be transmitted by the TCP sender to the TCP receiver during the predefined interval.

The invention is also defined by a network node, such as the network proxy, that includes a controller, such as a processor or other computing device that operates under control of an application comprising a computing readable medium, such as memory, for storing computer readable instructions for performing the various functions of the network node including those in FIG. 5. The controller will establish a TCP connection with a TCP receiver, generate a probe packet and transmits the probe packet to the TCP receiver. Additionally, the network node will include a counter that counts an idle time that corresponds to the interval between the current time and the time at which the last communication occurred with the TCP receiver. The controller will reset the counter, upon receipt of a probe packet acknowledgement from the TCP receiver, to avoid occurrence of the slow-start restart in the TCP connection. Additionally, the controller may provide for establishment of a congestion window at the node that defines the maximum amount of data that can be transmitted by the node and for the expansion of the congestion window upon receipt of the probe packet acknowledgement to allow for a greater amount of data to be transmitted.

In this regard, FIGS. 4 and 5 provide for methods, applications and devices according to the invention. It will be understood that each block or step of the flowcharts, and combinations of blocks in the flowcharts, can be implemented by computer program instructions. These computer program instructions may be loaded onto a computer or other programmable apparatus to produce a machine, such that the instructions which execute on the computer or other programmable apparatus create means for implementing the functions specified in the flowchart block(s) or step(s). These computer program instructions may also be stored in a computer-readable memory that can direct a computer or other programmable apparatus to function in a particular manner, such that the instructions stored in the computer-readable memory produce an article of manufacture including instruction means which implement the function specified in the flowchart block (s) or step(s). The computer program instructions may also be loaded onto a computer or other programmable apparatus to cause a series of operational steps to be performed on the computer or other programmable apparatus to produce a computer implemented process such that the instructions which execute on the computer or other programmable apparatus provide steps for implementing the functions specified in the flowchart block(s) or step(s).

Accordingly, blocks or steps of the flowcharts support combinations of means for performing the specified functions, combinations of steps for performing the specified functions and program instruction means for performing the specified functions. It will also be understood that each block or step of the flowchart, and combinations of blocks or steps in the flowchart, can be implemented by special purpose hardware-based computer systems that perform the specified functions or steps, or combinations of special purpose hardware and computer instructions.

Thus, the present invention serves to overcome the latency related to the "slow-start restart" by assessing network conditions and avoiding the "slow-start restart" when network conditions justify the avoidance. The implementation of the invention is especially relevant in wireless or mobile networks, in which latency adversely affects the performance of web services and diminishes user satisfaction.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method for avoiding slow-start restart in network communications, the method comprising:
   establishing a connection between a sender and a receiver;
   establishing a congestion window at the sender upon establishing the connection, wherein the congestion window defines a maximum amount of data that is transmittable by the sender prior to receipt of an acknowledgement to previously transmitted data from the receiver;
   setting an idle counter at the sender that measures an interval between a current time and a time of a last communication with the receiver;
   transmitting, from the sender to the receiver, a probe packet;
   receiving, from the receiver at the sender, upon receipt of the probe packet, an acknowledgement;
   expanding the congestion window upon receipt of the acknowledgement to the probe packet and prior to receipt of an acknowledgement to previously transmitted data from the receiver to allow for a greater amount of data to be transmitted; and
   resetting the idle counter to avoid occurrence of the slow-start restart in the communication upon receipt of the acknowledgement.

2. The method of claim 1, wherein transmitting, from the sender to the receiver, a probe packet further comprises transmitting, from the sender to the receiver, a probe packet having a sequence number that is one less than a receiver anticipated sequence number.

3. The method of claim 1, wherein transmitting, from the sender to the receiver, a probe packet further comprises transmitting the probe packet at a predefined time.

4. The method of claim 1, wherein transmitting, from the sender to the receiver, a probe packet further comprises transmitting, from the sender to the receiver, a probe packet at a predetermined time that is a median value of a round-trip time (RTT) and a retransmit timeout (RTO).

5. The method of claim 1, wherein transmitting, from the sender to the receiver, a probe packet further comprises transmitting, from the sender to the receiver, a probe packet at a predetermined time that is defined as one-half of a retransmit timeout (RTO).

6. The method of claim 1, wherein transmitting, from the sender to the receiver, a probe packet further comprises transmitting periodically, from the sender to the receiver, a probe packet at a predetermined time interval.

7. An application for avoiding "slow-start restart" at a sender, the application comprising a computer readable storage medium having computer-readable program instructions embodied in the medium, the computer-readable program instructions including:
   first instructions for establishing a connection between the sender and a receiver;
   second instructions for establishing a congestion window upon establishing the connection, wherein the congestion window defines a maximum amount of data that is transmittable to the receiver prior to receipt of an acknowledgement to previously transmitted data from the receiver;
   third instructions for setting an idle counter that measures an interval between a current time and a time of a last communication with the receiver, wherein the interval comprises an idle period;
   fourth instructions for transmitting a probe packet to the receiver;
   fifth instructions for receiving an acknowledgement to the probe packet from the receiver;
   sixth instructions for expanding the congestion window upon receipt of the acknowledgement to the probe packet and prior to receipt of an acknowledgement to previously transmitted data from the receiver to allow for a greater amount of data to be transmitted; and
   seventh instructions for resetting the idle counter to avoid occurrence of the slow-start restart in the communication upon receipt of the acknowledgement.

8. The application of claim 7, wherein the fourth instructions for transmitting further comprises instructions for transmitting a probe packet that includes an empty payload and a sequence number that is one less than a receiver anticipated sequence number.

9. The application of claim 7, wherein the fourth instructions for transmitting a probe packet to the receiver further comprises transmitting a probe packet to the receiver repeatedly during the idle period of the connection at a predetermined time interval.

10. The application of claim 7, wherein the fourth instructions for transmitting a probe packet to the receiver further comprises transmitting the probe packet at a predetermined periodic time interval defined as a median value of the round-trip time (RTT) and the retransmit timeout (RTO).

11. The application of claim 7, wherein fourth instructions for transmitting a probe packet to the receiver further comprises transmitting the probe packet at a predetermined periodic time interval defined as one-half the retransmit timeout (RTO).

12. An apparatus comprising a controller and a memory storing executable instructions that when executed cause the apparatus to at least:
   establish a connection with a client, generate a probe packet, transmit the probe packet to the client, provide for establishing a congestion window at the apparatus that defines a maximum amount of data that is transmittable by the apparatus prior to receipt of an acknowledgement to previously transmitted data from the client, and provide for expanding the congestion window upon receipt of a probe packet acknowledgement from the client and prior to receipt of an acknowledgement to previously transmitted data from the client to allow for a greater amount of data to be transmitted; and wherein executable instructions when executed further cause the apparatus to reset a counter that is configured to count an idle time that corresponds to an interval between a current time and a time of a last communication with the client upon receipt of the probe packet acknowledgement from the client, to avoid occurrence of the slow-start restart in the connection.

13. A method comprising:

establishing a connection with a receiver;

establishing a congestion window upon establishing the connection, wherein the congestion window defines a maximum amount of data that is transmittable to the receiver prior to receipt of an acknowledgement to previously transmitted data from the receiver;

setting an idle counter that measures an interval between a current time and a time of a last communication with the receiver;

transmitting a probe packet to the receiver;

receiving an acknowledgement to the probe packet from the receiver;

expanding the congestion window upon receipt of the acknowledgement to the probe packet and prior to receipt of an acknowledgement to previously transmitted data from the receiver to allow for a greater amount of data to be transmitted; and resetting the idle counter to avoid occurrence of the slow-start restart in the communication upon receipt of the acknowledgement.

14. The method of claim 13, wherein expanding the congestion window comprises expanding the congestion window at a sender device.

15. The method of claim 14, wherein the sender device comprises a network node comprising a controller configured to expand the congestion window.

* * * * *

UNITED STATES PATENT AND TRADEMARK OFFICE
CERTIFICATE OF CORRECTION

PATENT NO. : 7,609,640 B2
APPLICATION NO. : 10/741965
DATED : October 27, 2009
INVENTOR(S) : Ahuja et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1460 days.

Signed and Sealed this

Twelfth Day of October, 2010

David J. Kappos
*Director of the United States Patent and Trademark Office*